Aug. 16, 1966  H. M. SELLERS ETAL  3,266,329
MECHANICAL MOVEMENT
Filed Nov. 27, 1964
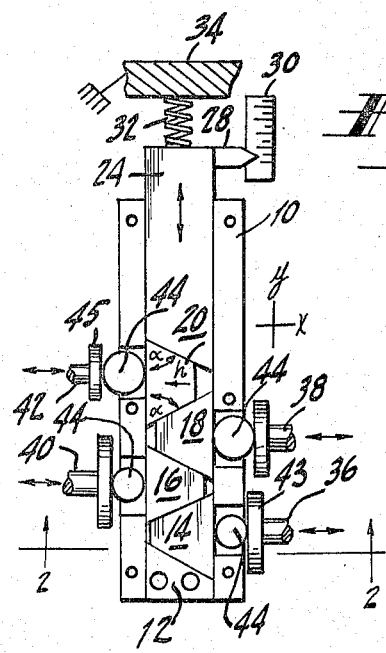
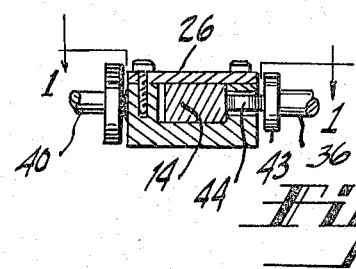
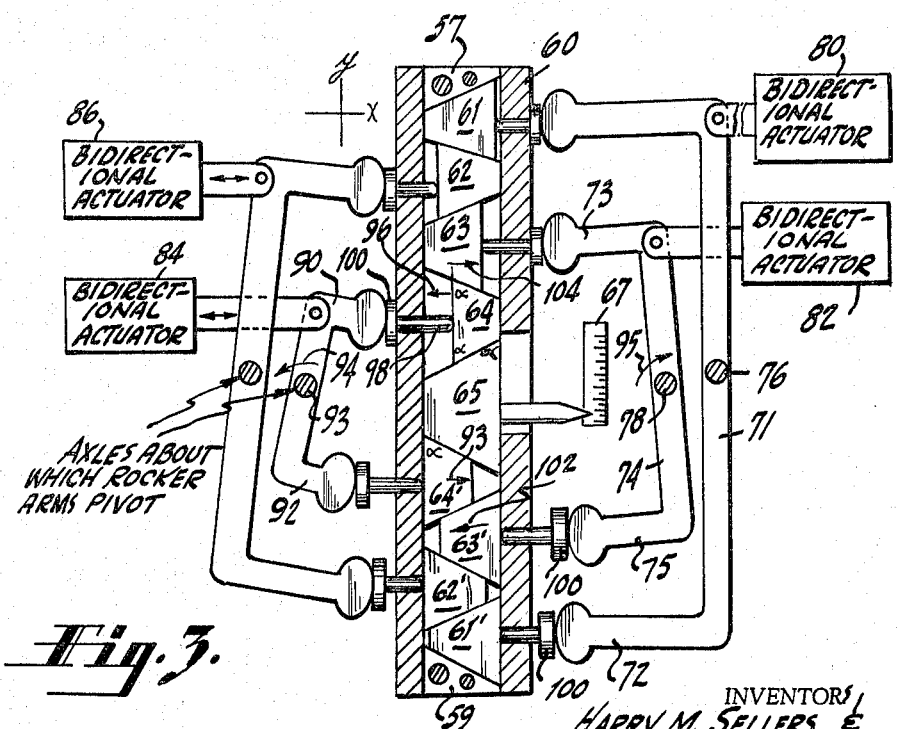
INVENTORS
HARRY M. SELLERS &
JAMES G. SEYMOUR
BY James Cohen
ATTORNEY

United States Patent Office 3,266,329
Patented August 16, 1966

3,266,329
MECHANICAL MOVEMENT
Harry M. Sellers, Riviera Beach, and James G. Seymour, Palm Beach, Fla., assignors to Radio Corporation of America, a corporation of Delaware
Filed Nov. 27, 1964, Ser. No. 414,346
4 Claims. (Cl. 74—110)

This invention relates to a new and improved mechanical positioning device which may be of the binary code actuated type.

The object of the invention is to provide a positioner which is highly accurate and which seeks the position to which it is driven at relatively high speed and with relatively little hunting or bounce.

The arrangement of the invention includes two groups of non-aligned adjacent bearings in an elongated housing. One group of the bearings is arranged on one side of a slidable element in the housing and the other group of bearings is arranged on the other side of the slidable element. One or more bearings in one group is driven in a first direction substantially perpendicular to the length dimension of the housing and a corresponding bearing or bearings in the other group is released and permitted to move in a direction opposite to the first direction, to effect the movement of the floating element.

The invention is discussed in greater detail below and is described in the accompanying drawing, of which:

FIGURE 1 is a section along line 1—1 of FIGURE 2 of a known binary code actuated mechanical positioning device;

FIGURE 2 is a cross-section taken along line 2—2 of FIGURE 1; and

FIGURE 3 is a cross-section through an improved binary code actuated positioner according to the invention.

FIGURES 1 and 2 show an elongated housing 10 which is closed at one end by element 12. Wedge-shaped bearings 14, 16, 18 and 20 are located in the housing. A slidable element 24 is adjacent the last wedge-shaped bearing 20 and extends outside the housing 10. A cover plate 26 (FIGURE 2) keeps the various bearings and the slidable element 24 in place.

The load being driven, shown as a pointer 28, is secured to the end portion of the slidable element 24 which extends from the housing. A scale 30 is located beneath the pointer, and a spring 32, which is under compression, is positioned between the chassis 34 and the end portion of the slidable element 24.

The wedge-shaped bearings may be driven by bars 36, 38, 40 and 42 respectively. These bars lead to solenoids or other actuating devices (not shown). Cam elements 44 are located in slots in the housing between the buttons at the ends of the bars and the wedge-shaped bearings. When the bars are inactive (withdrawn) the spring 32 returns the elements to their home position, as shown in FIGURE 1.

The wedge-shaped elements all have the same base angles α but are of different heights (*h*). For example, if the space between the narrow end or apex of the largest bearing 14 and the adjacent wall is one unit in width, the corresponding spaces for the successively smaller bearings 16, 18 and 20 may be two, four and eight units, respectively. When the bearings are moved to close these spaces (movement in the *x* direction), the bearings also move in the direction of the long axis of the housing (the *y* direction). The number of units of movement in the *x* direction made by the bearings is equal to the number of units of movement in the *y* direction made by the bearings, although the *x* and *y* units may or may not be equal, depending upon the base angles α.

In the operation of the arrangement of FIGURES 1 and 2, the amount of linear travel of the slidable element 24 and the pointer 28 connected to the slidable element depends upon the number of wedges which are actuated. For example, if the bars 36 and 42 are driven to their limit position—their buttons 43 and 45 in their closest position to the exterior surfaces of the housing—the buttons drive the cams 44, and the cams drive the wedge-shaped elements 14 and 20, all in the *x* direction. The movement of the bearings causes movement of the slidable element in the *y* direction. The wedge-shaped element 14 moves one *x* unit, and the wedge-shaped element 20 moves eight *x* units, whereby the total movement of the pointer 28 is nine *y* units.

The known positioner of FIGURES 1 and 2 exhibits a number of disadvantages. First, the spring bias, which is necessary to return the slidable element 24 and bearing(s) to their initial positions when the one or more of the bars 36, 38, 40 and 42 is withdrawn, increases the inertia of the system and makes it relatively sluggish. And, there is a certain amount of hunting which occurs before the load comes to rest, perhaps due to the mechanical resonances which are set up when the bearings are actuated at high speed.

The improved arrangement of FIGURE 3 has been found to overcome the disadvantages above. This arrangement includes a housing 60 closed at its ends by elements 57 and 59 and two groups of bearings 61–64 and 61'–64'. A slidable, floating element 65 is located between the two groups of bearings. The load, illustrated schematically as a pointer 66, is fixed to the slidable element 65. (In practice, the load may be one or more read-write heads which it is desired to position over tracks on a magnetic card, tape or the like.) Scale 67 is adjacent to the pointer 66.

The bearings above are driven by rocker arms. For example, rocker arm 70, 71, 72 actuates bearing 61 and releases bearing 61' or vice versa; rocker arm 73, 74, 75 actuates bearing 63 and releases bearing 63' or vice versa; and so on. Each rocker arm is rotatable through a relatively small angle about an axle passing through the center portion of the rocker arm. For example, axles supporting rocker arm portions 71 and 74 appear at 76 and 78.

As in the case of the positioner of FIGURE 1, the wedge-shaped bearings of FIGURE 3 all have the same base angles α (as does element 65) but are of different size. For example, the corresponding bearings 64 and 64' are the smallest of their respective groups and each is capable of being driven through a space equivalent to eight *x* units. The corresponding bearings 63 and 63' may be driven through a space equivalent to four *x* units, and so on. The driving means comprises bi-directional actuators shown at 80, 82, 84 and 86. These may be double-acting air cylinders, or hydraulically operated devices, or solenoids, or the like.

In FIGURE 3, the pointer 66 is in its bottom position. If it is desired to move the pointer, say twelve units, bi-directional actuators 84 and 82 are energized. Actuator 84 causes the rocker arm 90, 91, 92 to rotate about axle 93 in the direction of arrow 94. Actuator 82 causes the rocker arm 73, 74, 75 to rotate about axle 78 in the direction of arrow 95. The movement of portion 92 of the rocker arm toward the housing 60 drives the wedge-shaped bearing 64' in the direction of arrow 93 and this tends to move slidable element 65 in the upward direction as viewed in the drawing. The movement of element 65 causes element 64 to move in the direction of arrow 96 and this, in turn, causes the pin 98 and the button 100 to move. Such movement is possible as the portion 90 of the rocker arm has been withdrawn by the bi-directional actuator 84. In a similar manner, the actuation of the rocker arm 73, 74, 75 drives bearing 63' in the direction of arrow 102 and releases the corresponding element 63 thereby permitting its movement in the direction of arrow 104. The movement of bearing 63' also results in the movement of the slidable element 65 in the upward direction. The overall result of the actuation of the two rocker arms is to move the slidable element 65 and its pointer 66 twelve units in the upward or y direction.

In a preferred embodiment of the invention, the buttons 100 are permitted to "bottom" 0.0002 inch or less before the wedge-shaped bearings. This permits the wedge-shaped bearings to "float," that is, they do not lock in place against the walls of the housing. Accordingly, the braking action of the bearings is minimal.

The base angles α employed for the wedges was 63° 26'. It was found preferable from the point of view of wear to make the wedges all of the same width (approximately 0.250 inch) at their apex, rather than of the same width at their base, although either configuration is possible.

The arrangement of FIGURE 3 has been found to be able to duplicate a position to an accuracy of 0.0002 inch. It has also been found to be quick-acting and to have relatively negligible hunting or bounce.

A cross-section through the arrangement of FIGURE 3 does not appear in the drawing, since it is quite similar to the cross-section of FIGURE 2.

What is claimed is:
1. In combination,
   an elongated housing;
   a slidable element in the housing;
   two like groups of non-aligned, adjacent bearings in the housing, one group on one side of the slidable element and the other group on the other side of the slidable element; and
   means for concurrently driving one of the bearings in one group in a first direction substantially perpendicular to the length dimension of the housing and releasing a corresponding bearing in the other group to permit movement thereof in a direction opposite to the first direction, to effect the movement of the slidable element.

2. In combination,
   an elongated housing;
   a slidable element in the housing;
   two like groups of non-aligned, wedge-shaped, adjacent bearings in the housing, one group on one side of the slidable element and the other group on the other side of the slidable element; and
   means for concurrently driving one of the bearings in one group in a first direction substantially perpendicular to the length dimension of the housing and releasing a corresponding bearing in the other group to permit movement thereof in a direction opposite to the first direction, to effect the movement of the slidable element.

3. In combination,
   an elongated housing;
   a slidable element in the housing;
   two like groups of non-aligned, adjacent bearings in the housing, one group on one side of the slidable element and the other group on the other side of the slidable element; and
   means for individually driving the bearings in the first group different distance in directions substantially perpendicular to the length dimension of the housing and for concurrently, individually releasing corresponding bearings in the other group to permit respective movements thereof in directions opposite to those of the bearings of the first group, to effect the movement of the slidable element.

4. In combination,
   an elongated housing;
   a wedge-shaped slidable element in the housing;
   two like groups of non-aligned, adjacent, wedge-shaped bearings in the housing, one group on one side of the slidable element and the other group on the other side of the slidable element, the bearings and element extending in the direction of the long axis of the housing; and
   means for individually driving the bearings in the first group different distances in directions substantially perpendicular to the length dimension of the housing and for concurrently, individually releasing corresponding bearings in the other group to permit respective movements thereof in directions opposite to those of the bearings of the first group, to effect the movement of the slidable element.

References Cited by the Examiner
UNITED STATES PATENTS

| | | | |
|---|---|---|---|
| 2,122,678 | 7/1938 | Bruce | 188—204 |
| 2,319,322 | 5/1943 | Hefel | 250—103 |
| 3,101,233 | 8/1963 | McNaney | 346—107 |
| 3,154,700 | 10/1964 | McNaney | 310—8.3 |

FRED C. MATTERN, JR., *Primary Examiner.*

F. E. BAKER, *Assistant Examiner.*